(12) United States Patent
Ishikawa et al.

(10) Patent No.: US 6,452,976 B1
(45) Date of Patent: Sep. 17, 2002

(54) DATA TRANSFER CIRCUIT WITH REDUCED CURRENT CONSUMPTION

(75) Inventors: Masatoshi Ishikawa; Hiroaki Tanizaki, both of Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/397,142

(22) Filed: Sep. 16, 1999

(30) Foreign Application Priority Data

May 27, 1999 (JP) ............................................. 11-148241

(51) Int. Cl.$^7$ .............................. H04B 3/00; H04L 25/00

(52) U.S. Cl. ........................ 375/257; 375/354; 327/403

(58) Field of Search ................................. 375/220, 257, 375/259, 354, 377; 327/403, 407; 710/100

(56) References Cited

U.S. PATENT DOCUMENTS 5,339,268 A * 8/1994 Machida ................. 365/189.05
5,765,194 A * 6/1998 McBride ..................... 711/138

FOREIGN PATENT DOCUMENTS

JP          8-50788          2/1996
JP         10-241371         9/1998

* cited by examiner

Primary Examiner—Don N. Vo
(74) Attorney, Agent, or Firm—McDermott, Will & Emery (57) ABSTRACT

In a DRAM, a data transfer circuit includes a control circuit which selects a data transfer line to be discharged from high to low and a data transfer line to be precharged from low to high for the subsequent data transfer period and turn on an n channel MOS transistor between the selected two data transfer lines for a predetermined period. A positive charge of a data transfer line can be effectively used to reduce current consumption.

3 Claims, 8 Drawing Sheets

DATA TRANSFER CIRCUIT WITH REDUCED CURRENT CONSUMPTION

BACKGROUND OF THE INVENTION

1. Field of the Invention

The present invention relates to data transfer circuits and in particular to data transfer circuits synchronized with a clock signal to transfer data from a transmitting circuit to a receiving circuit.

2. Description of the Background Art

Conventionally it is well known that as a method of transferring data between semiconductor integrated circuit devices or internally in a semiconductor integrated circuit device, two data transfer lines arranged between a transmitting circuit and a receiving circuit are initially precharged to a same potential (e.g., precharged high) and one or the other data transfer line is then set low to transfer data "0" or "1".

In this data transfer method, however, the two data transfer lines must initially be precharged high for each data transfer, disadvantageously resulting in an increased time required for precharging the data transfer lines and thus a decreased data transfer rate when the data transfer lines are increased in length and hence wiring capacitance and wiring resistance.

The inventors of the present invention have proposed a method of preventing reduction of data transfer rate by arranging three data transfer lines between a transmitting circuit and a receiving circuit. In this method, while two of the three data transfer lines are used to transfer data the remaining one data transfer line is precharged high, and in the subsequent data transfer period two of the three data transfer lines that are held high are used to transfer data, thereby preventing reduction in data transfer rate.

In this data transfer method, however, a data transfer line is precharged during data transfer and more current can be disadvantageously consumed than when a data transfer line is precharged conventionally after data transfer.

SUMMARY OF THE INVENTION

Therefore a main object of the present invention is to provide a data transfer circuit with high data transfer rate and reduced current consumption.

Briefly speaking of the present invention, three sets of an upstream signal line and a downstream signal line are provided between a transmitting circuit and a receiving circuit and a signal transmission circuit operating in synchronization with a clock signal is provided between each upstream signal line and each downstream signal line. A first select circuit selects two upstream signal lines of a first potential to set one of the two upstream signal lines of the first potential to a second potential to transmit data and also to precharge the remaining one upstream signal line to the first potential. Furthermore, a second select circuit selects two downstream signal lines of the first potential to connect the two downstream signal lines of the first potential to the receiving circuit and also to precharge the remaining one downstream signal line to the first potential. Furthermore, a third select circuit selects a downstream signal line to be set to the second potential and a downstream signal line to be precharged to the first potential for a subsequent data transfer period to connect the two selected downstream signal lines together via a connection circuit for a predetermined period. Thus, a downstream signal line to be set from the first potential to the second potential supplies an electrical charge to a downstream signal line to be precharged from the second potential to the first potential. Thus, the electrical charge can be effectively used to reduce current consumption.

Preferably the third select circuit includes a logic circuit associated with respective two of the three sets of an upstream signal line and a downstream signal line to output a control signal in response to the fact that the second potential has been attained by both the upstream signal line of one of the respective two sets of upstream and downstream signal lines and the downstream signal line of the other of the respective two sets of upstream and downstream signal lines, and a hold circuit holding a signal output from the logic circuit and outputting the signal in synchronization with a clock signal for a predetermined period of time, wherein the connection circuit includes a switching element associated with the logic circuit and connected between associated two downstream signal lines to conduct in response to the fact that an associated hold circuit has output the control signal. Thus the third select circuit and the connection circuit can readily be configured.

Still preferably a downstream signal line is larger in capacitance than an upstream signal line and in such example the present invention is particularly effective.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 8A to 8M are timing diagrams representing an operation of a transfer circuit 5 shown in FIG. 1.

DESCRIPTION OF THE PREFERRED EMBODIMENTS

Figure 1:
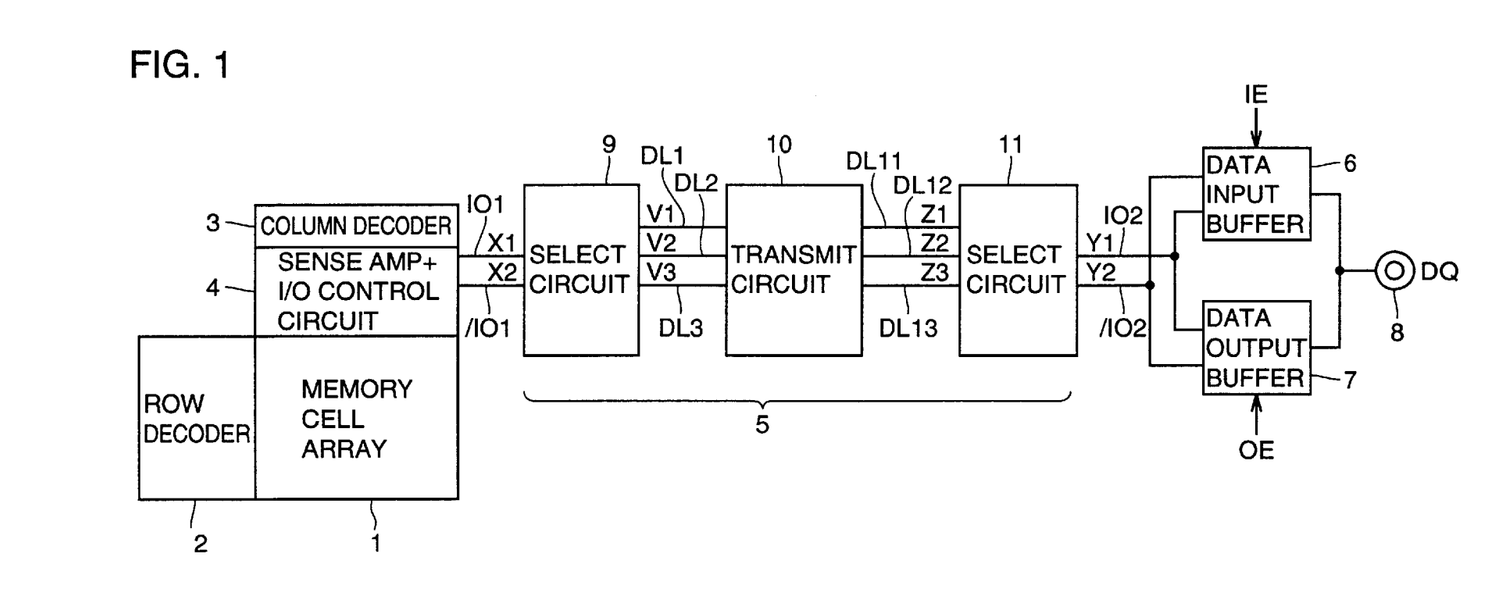
FIG. 1 is a block diagram showing a configuration of a DRAM of one embodiment of the present invention.

FIG. 1 is a block diagram showing a main portion of a DRAM of one embodiment of the present invention. Referring to FIG. 1, the DRAM is comprised of a memory cell array 1, a row decoder 2, a column decoder 3, a sense amplifier and input/output control circuit 4, data input/output lines IO1, /IO1, IO2, /IO2, a data transfer circuit 5, a data input buffer 6, a data output buffer 7, and a data input/output terminal 8.

Memory cell array 1 includes a plurality of memory cells arranged in rows and columns. Each memory cell is previously allocated a specific address. Each memory cell stores 1-bit data.

Row decoder 2 designates a row address of memory cell array 1 in response to an externally applied row address signal. Column decoder 3 designates a column address of memory cell array 1 in response to an externally applied column address signal. Sense amplifier and input/output control circuit 4 couples a memory cell of an address designated by row and column decoders 2 and 3 with data input/output lines IO1, /IO1.

In write operation, data provided as a potential difference X1–X2 between data input/output lines IO1 and/IO1 is written into a memory cell designated by row and column decoders 2 and 3. In read operation, data of a memory cell designated by row and column decoders 2 and 3 is read in the form of potential difference X1–X2 between data input/output lines IO1 and/IO1 via sense amplifier and input/output control circuit 4.

Data transfer circuit 5 transfers the data read as potential difference X1–X2 between data input/output lines IO1 and/IO1 in read operation to data input/output lines IO2 and/IO2. In effect there is also provided a data transfer circuit for transferring in write operation the data provided as a potential difference Y1–Y2 between data input/output lines IO2 and/IO2 to data input/output lines IO1 and/IO1, although it is similar in configuration to data transfer circuit 5, except that the direction in which data is transferred is different, and it will thus not be shown or described.

Data input buffer 6 responds to an input enable signal IE in write operation by supplying data input externally via data input/output terminal 8 to data input/output lines IO2, /IO2. Data output buffer 7 responds to an output enable signal OE in read operation by outputting data read on data input/output lines IO2, /IO2 to data input/output terminal 8.

Data transfer circuit 5 will now be described more specifically. Data transfer circuit 5 includes select circuits 9, 11, a transmission circuit 10, relatively short, data transfer lines BL1–BL3, and relatively long, data transfer lines DL11–DL13. Data transfer lines DL11–DL13 are longer and hence larger in capacitance than data transfer lines DL1–DL3.

Select circuit 9 is connected to sense amplifier and input/output control circuit 4 via data input/output lines IO1 and/IO1 and also to transmission circuit 10 via data transfer lines DL1–DL3. Select circuit 9 compares potentials B1 to B3 of data transfer lines DL1 to DL3 to select and connect two data lines (DLs1 and 3, for example) of a same potential (high level) to data input/output lines IO1 and/IO1, respectively, and also precharge the remaining one data transfer line DL2 high.

Figure 2:
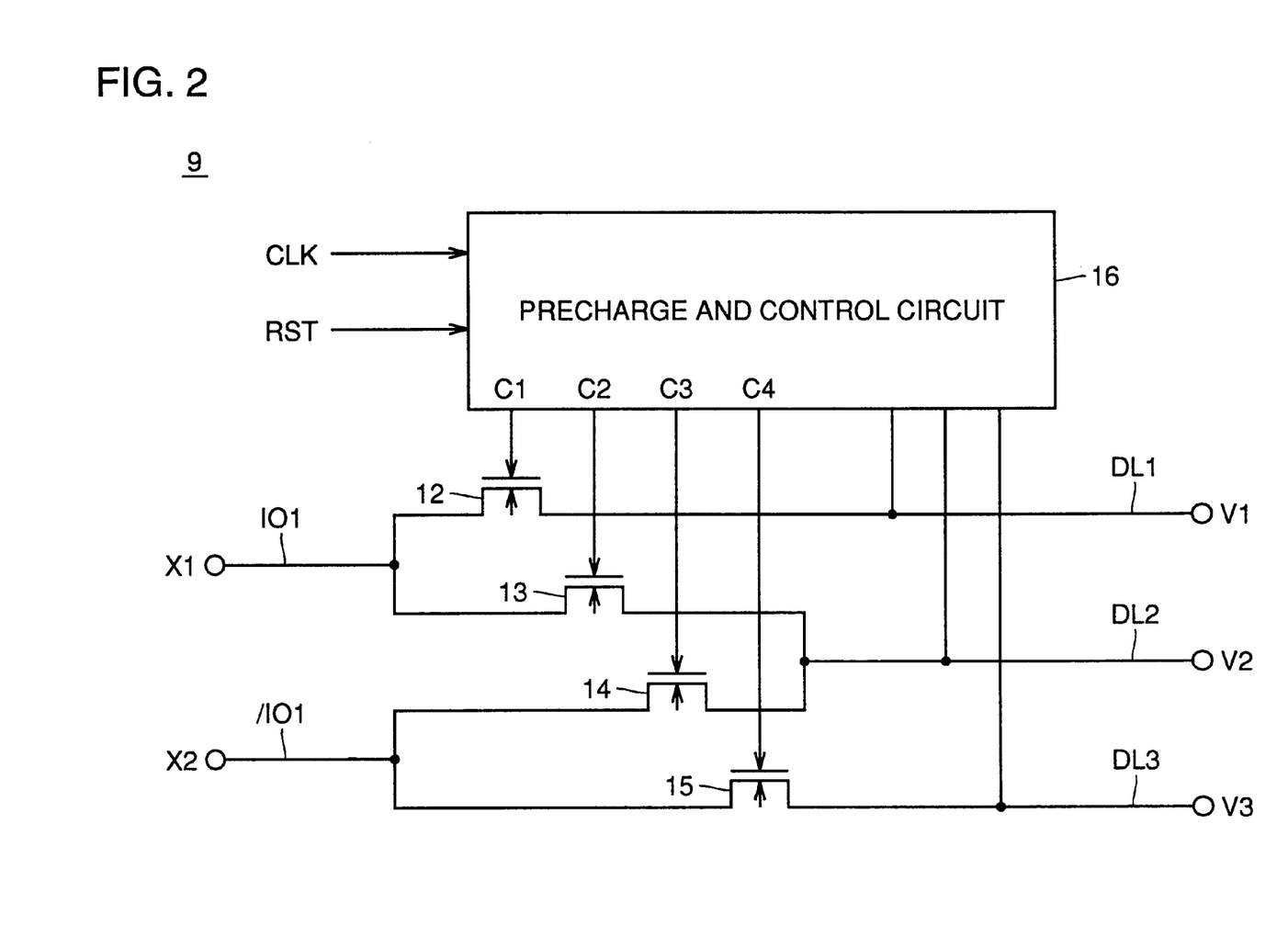
FIG. 2 is a circuit block diagram showing a configuration of a select circuit 9 shown in FIG. 1.

More specifically, select circuit 9 includes n channel MOS transistors 12–15 and a precharge and control circuit 16, as shown in FIG. 2. N channel MOS transistor 12 is connected between one end of data input/output line IO1 and one end of data transfer line DL1, with its gate receiving a control signal C1. N channel MOS transistor 13 is connected between one end of data input/output line IO1 and one end of data transfer line DL2, with its gate receiving a control signal C2. N channel MOS transistor 14 is connected between one end of data input/output line /IO1 and one end of data transfer line DL2, with its gate receiving a control signal C3. N channel MOS transistor 15 is connected between one end of data input/output line /IO1 and one end of data transfer line DL3, with its gate receiving a control signal C4.

Precharge and control circuit 16 responds to a clock signal CLK, a reset signal RST and potentials V1 to V3 of data transfer lines DL1 to DL3 by generating control signals C1 to C4 and precharging data transfer lines DL1 to DL3.

Figure 3:
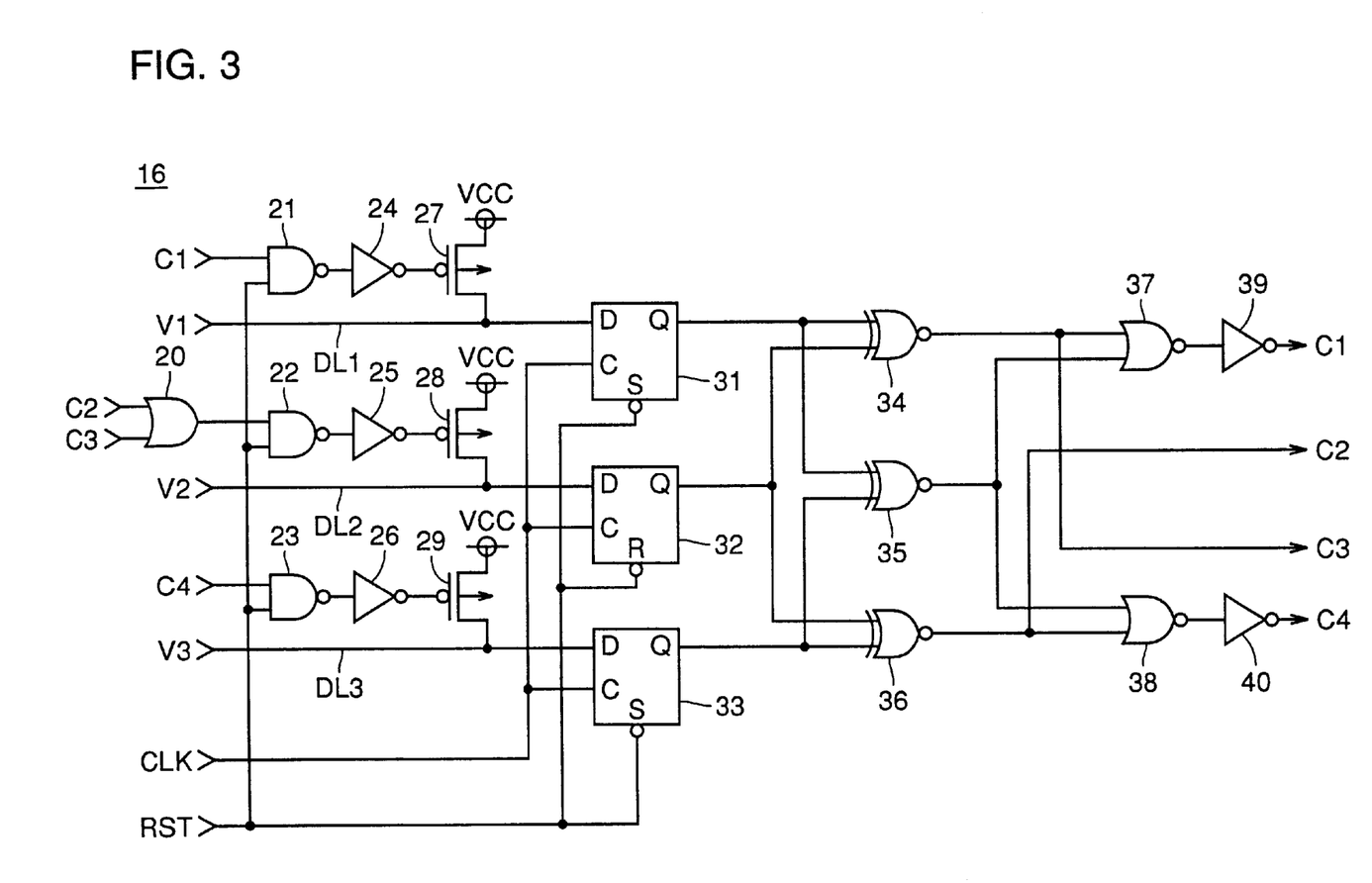
FIG. 3 is a circuit diagram showing a configuration of a precharge and control circuit shown in FIG. 2.

As shown in FIG. 3, precharge and control circuit 16 includes an OR gate 20, NAND gates 21–23, inverters 24–26, 39, 40, p channel MOS transistors 27–29, flipflops 31–33, EX-NOR gates 34–36, and NOR gates 37, 38. P channel MOS transistors 27–29 are each connected between a power supply potential VCC line and a respective one of data transfer lines DL1–DL3.

NAND gate 21 receives control signal C1 and reset signal RST and outputs a signal which is in turn input via inverter 24 to p channel MOS transistor 27 at its gate. OR gate 20 receives control signals C2, C3. NAND gate 22 receives a signal output from OR gate 20 and reset signal RST and outputs a signal which is in turn input via inverter 25 to p channel MOS transistor 28 at its gate. NAND gate 23 receives control signal C4 and reset signal RST and outputs a signal which is in turn input via inverter 26 to p channel MOS transistor 29 at its gate.

When reset signal RST is held low, p channel MOS transistors 27–29 turn on, regardless of the levels of control signals C1–C4, and data transfer lines DL1–DL3 are precharged high. When reset signal RST is held high and control signal C1 is also held low, p channel MOS transistor 27 turns on and data transfer line DL1 is precharged high. When reset signal RST is held high and control signals C2 and C3 are also held low, p channel MOS transistor 28 turns on and data transfer line DL2 is precharged high. When reset signal RST is held high and control signal C4 is also held low, p channel MOS transistor 29 turns on and data transfer line DL3 is precharged high.

Potentials V1–V3 of data transfer lines DL1–DL3 are respectively input to flipflops 31–33 at their respective data input terminals Ds. Clock signal CLK is input to flipflops 31–33 at their respective clock terminals Cs. Reset signal RST is input to flipflops 31 and 33 at their respective set terminals Ss and also to flipflop 32 at a reset terminal R.

When reset signal RST is held low, flipflops 31 and 33 each output a high level signal, regardless of input potentials V1 and V3. When reset signal RST is held low, flipflop 32 outputs a low level signal, regardless of input potential V2. When reset signal RST is held high, flipflops 31–33 responds to a high to low transition of clock signal CLK by latching potentials V1–V3 of data transfer lines DL1–DL3 and outputting latched potentials V1–V3.

EX-NOR gate 34 receives outputs from flipflops 31 and 32. EXNOR gate 35 receives outputs from flipflops 31 and 33. EX-NOR gate 36 receives outputs from flipflops 32 and 33. EX-NOR gates 34 and 36 output signals which serve as control signals C3 and C2, respectively. NOR gate 37 receives outputs from EX-NOR gates 34 and 35 and outputs a signal which is in turn inverted by inverter 39 and provided as control signal C1. NOR gate 38 receives outputs from EX-NOR gates 35 and 36 and outputs a signal which is in turn inverted by inverter 40 and provided as control signal C4.

When reset signal RST is held low, flipflop 31 outputs a high level signal, flipflop 32 outputs a low level signal and flipflop 33 outputs a high level signal. Thus the outputs from flipflops 31 and 33 match in level and EX-NOR gate 35 outputs a high level signal so that control signals C1 and C4 go high to turn on n channel MOS transistors 12 and 15 shown in FIG. 2 and thus connect data transfer lines DL1, DL3 to data input/output lines IO1, /IO1.

When reset signal RST is held high, data transfer lines DL1–DL3 potentials V1–V3 are latched by flipflops 31–33 in response to a high to low transition of clock signal CLK. When flipflops 31 and 32 output signals matching in level, EX-NOR gate 34 outputs a high level signal so that control signals C1 and C3 go high to turn on n channel MOS transistors 12 and 14 shown in FIG. 2 and thus connect data transfer lines DL1, DL2 to data input/output lines IO1, /IO1.

When flipflops 31 and 33 output signals matching in level, EX-NOR gate 35 outputs a high level signal so that control signals C1 and C4 go high to turn on n channel MOS transistors 12 and 15 of FIG. 2 and thus connect data transfer lines DL1, DL3 to data input/output lines IO1, /IO1.

When flipflops 32 and 33 output signals matching in level, EX-NOR gate 36 outputs a high level signal so that control signals C2 and C4 go high to turn on n channel MOS transistors 13 and 15 shown in FIG. 2 and thus connect data transfer lines DL2, DL3 to data input/output lines IO1, /IO1.

Select circuit 11 is connected to data input and output buffers 6 and 7 via data input/output lines IO2, /IO2 and also to transmission circuit 10 via relatively long, data transfer lines DL11–DL13. Select circuit 11 compares potentials Z1–Z3 of data transfer lines DL11–DL13 to select and connect two data transfer lines (DL11 and DL13, for example) of a same potential (high level) to data input/output lines IO2 and /IO2, respectively, and also precharge the remaining one data transfer line DL2 high.

Figure 4:
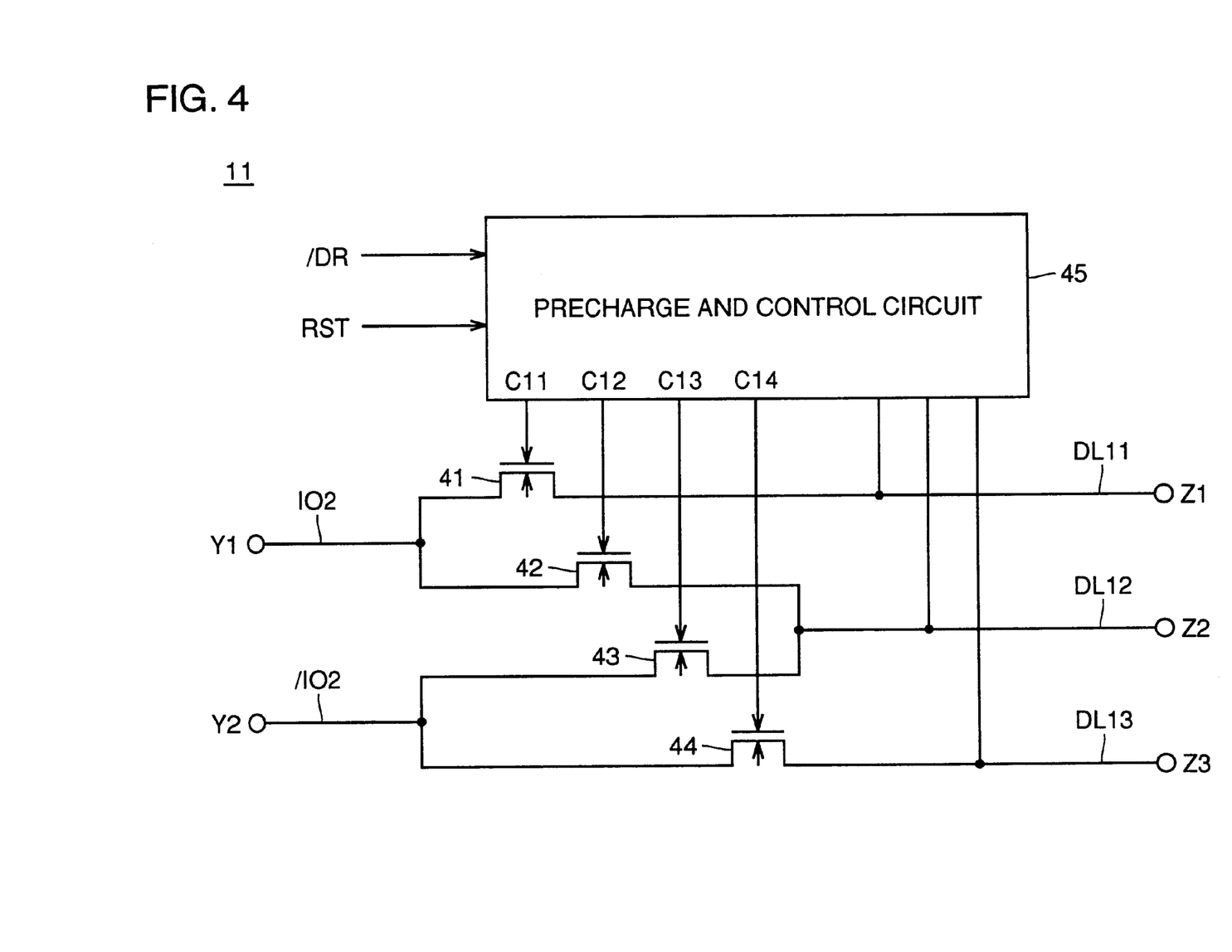
FIG. 4 is a circuit block diagram showing a configuration of a select circuit 11 shown in FIG. 1.

More specifically, select circuit 11 includes n channel MOS transistors 41–44 and a precharge and control circuit 45, as shown in FIG. 4. N channel MOS transistor 41 is connected between one end of data input/output line IO2 and one end of data transfer line DL11, with its gate receiving a control signal C11. N channel MOS transistor 42 is connected between one end of data input/output line IO2 and one end of data transfer line DL12, with its gate receiving a control signal C12. N channel MOS transistor 43 is connected between one end of data input/output line /IO2 and one end of data transfer line DL12, with its gate receiving a control signal C13. N channel MOS transistor 44 is connected between one end of data input/output line /IO2 and one end of data transfer line DL13, with its gate receiving a control signal C14.

Figure 5:
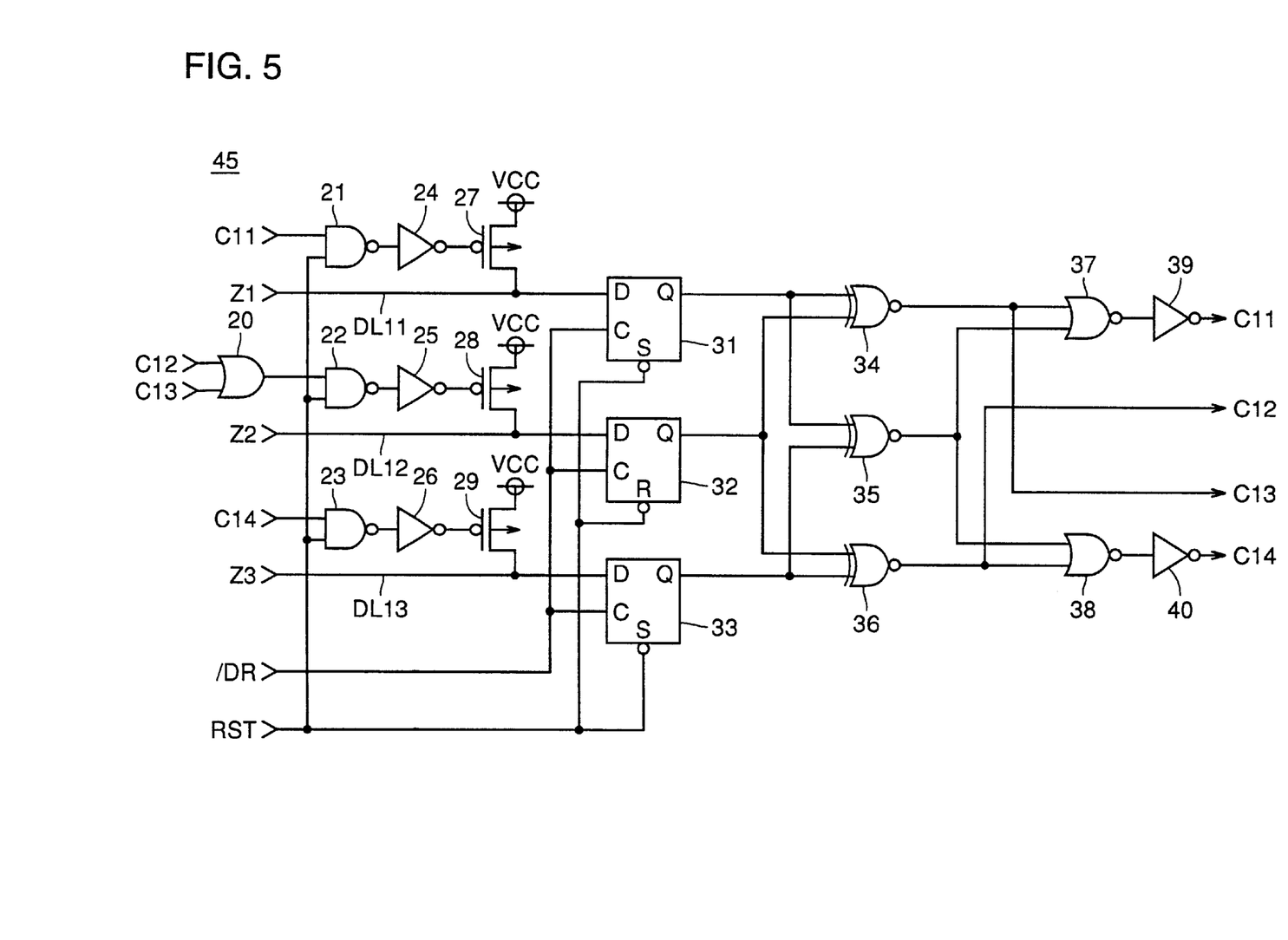
FIG. 5 is a circuit diagram showing a configuration of a precharge and control circuit shown in FIG. 4.

Precharge and control circuit 45 responds to a drive signal /DR, reset signal RST and data transfer lines DL11–DL13 potentials C1–C3 by generating control signals C11–C14 and also precharging data transfer lines DL11–DL13. As shown in FIG. 5, precharge and control circuit 45 has the same configuration as precharge and control circuit 16 shown in FIG. 3, except that data transfer lines DL1–DL3 are replaced by data transfer lines DL11–DL13 and control signals C1–C4 are replaced by control signals C11–C14.

When reset signal RST is held low, p channel MOS transistors 27–29 turn on, regardless of the levels of control signals C11–C14, to precharge data transfer lines DL11–DL13 high. When reset signal RST goes high and control signal C11 is also held low, p channel MOS transistor 27 turns on and data transfer line DL11 is precharged high. When reset signal RST goes high and control signals C12 and C13 are also held low, p channel MOS transistor 28 turns on and data transfer line DL12 is precharged high. When reset signal RST goes high and control signal C14 is also held low, p channel MOS transistor 29 turns on and data transfer line DL13 is precharged high.

When reset signal RST is held low, flipflop 31 outputs a high level signal, flipflop 32 outputs a low level signal and flipflop 33 outputs a high level signal. Thus the outputs from flipflops 31 and 33 match in level and EX-NOR gate 35 outputs a high level signal so that control signals C11 and C14 go high to turn on n channel MOS transistors 41 and 44 shown in FIG. 4 and thus connect data transfer lines DL11, DL13 to data input/output lines IO2, /IO2.

When reset signal RST is held high, data transfer lines DL11–DL13 potentials Z1–Z3 are latched by flipflops 31–33 in response to a high to low transition of drive signal /DR. When flipflops 31 and 32 output signals matching in level, EX-NOR gate 34 outputs a high level signal so that control signals C11 and C13 go high to turn on n channel MOS transistors 41 and 43 of FIG. 4 and thus connect data transfer lines DL11, DL12 to data input/output lines IO2, /IO2.

When flipflops 31 and 33 output signals matching in level, EX-NOR gate 35 outputs a high level signal so that control signals C11 and C14 go high to turn on n channel MOS transistors 41 and 44 of FIG. 4 and thus connect data transfer lines DL11, DL13 to data input/output lines IO2, /IO2.

When flipflops 32 and 33 outputs signals matching in level, EX-NOR gate 36 outputs a high level signal so that control signals C12 and C14 go high to turn on n channel MOS transistors 42 and 44 of FIG. 4 and thus connect data transfer lines DL12, DL13 to data input/output lines IO2, /IO2.

Figure 6:
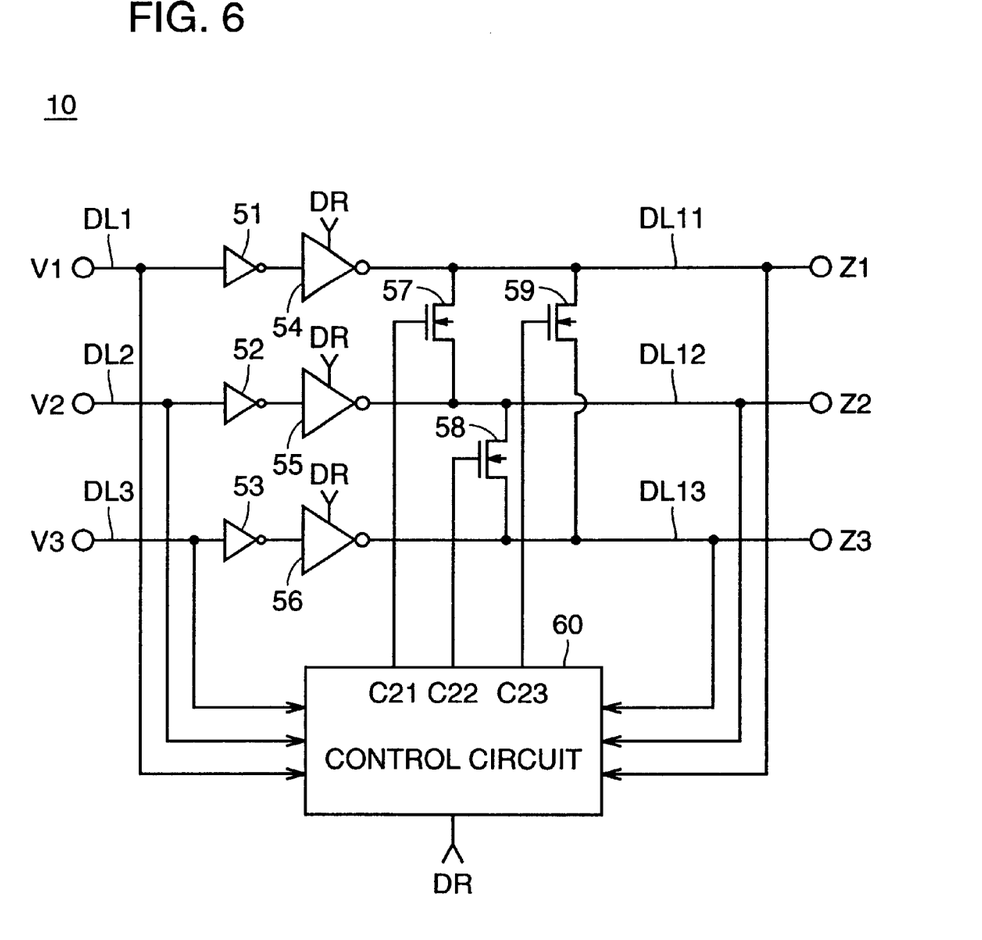
FIG. 6 is a circuit block diagram showing a configuration of a transmission circuit shown in FIG. 1.

Referring to FIG. 6, transfer circuit 10 includes inverters 51–53, clocked inverters 54–56, n channel MOS transistors 57–59, and a control circuit 60. Inverter 51 and clocked inverter 54 are connected in series between the other end of data transfer line DL1 and the other end of data transfer line DL11. Inverter 52 and clocked inverter 55 are connected in series between the other end of data transfer line DL2 and the other end of data transfer line DL12. Inverter 53 and clocked inverter 56 are connected in series between the other end of data transfer line DL3 and the other end of data transfer line DL13. N channel MOS transistor 57 is connected between data transfer lines DL11 and DL12, with its gate receiving a control signal C21. N channel MOS transistor 58 is connected between data transfer lines DL12 and DL13, with its gate receiving a control signal C22. N channel MOS transistor 59 is connected between data transfer lines DL13 and DL11, with its gate receiving a control signal C23.

Control circuit 60 is intended to respond to potentials V1–V3 and Z1–Z3 of data transfer lines DL1–DL3 and DL11–DL13 by selecting a data transfer line (DL11) to be discharged from high to low and a data transfer line (DL12, for example) to be precharged from low to high and turning on n channel MOS transistors 57 between selected data transfer lines DL11 and DL12 for a predetermined period of time to effectively use the positive charge of data transfer line DL11.

Figure 7A:
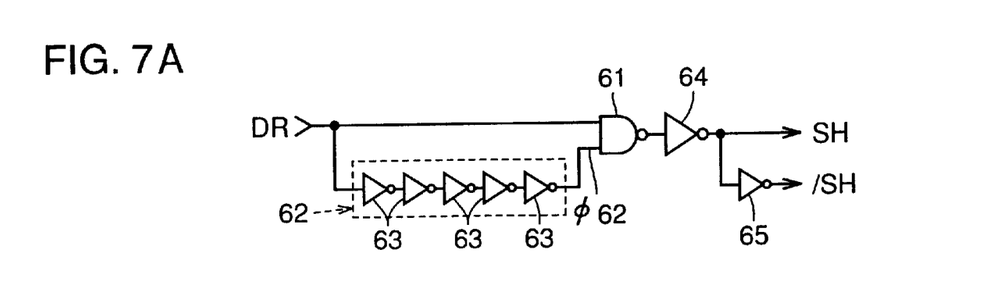
FIGS. 7A and 7B are circuit diagrams showing a configuration of a control circuit shown in FIG. 6.
Figure 7B:
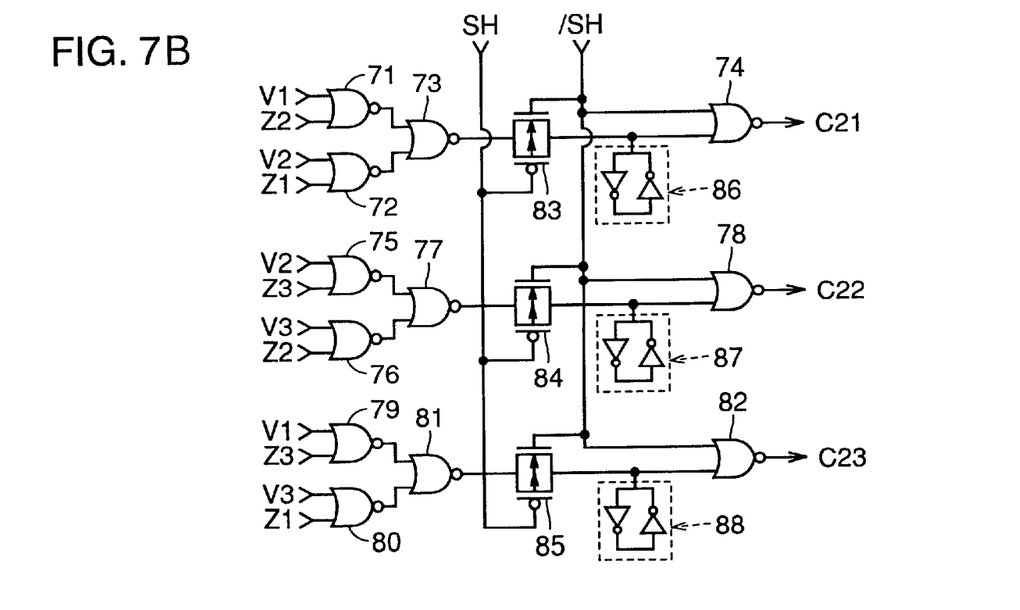

More specifically, as shown in FIGS. 7A and 7B, control circuit 60 includes an NAND gate 61, a delay circuit 62, inverters 64, 65, NOR gates 71–82, transfer gates 83–85, and latch circuits 86–88. Drive signal DR is input to NAND gate 61 at one input node directly and at the other input node via delay circuit 62. Delay circuit 62 includes an odd number of (five in the figure) inverters 63 connected in series. NAND gate 61 outputs a signal which is in turn inverted by inverter 64 and provided as a signal SH, and signal SH is inverted by inverter 65 and provided as a signal /SH.

Figures 8A, 8B:
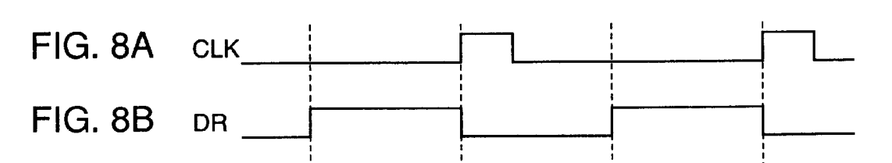
Figure 8C:
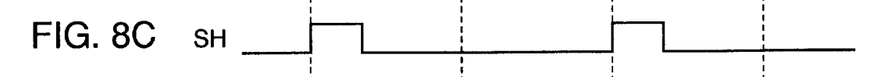
Figure 8D:
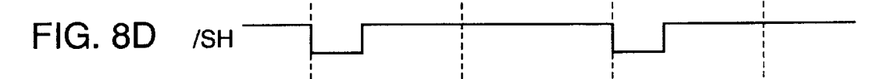
Figure 8E:
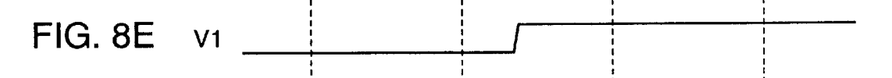
Figure 8F:
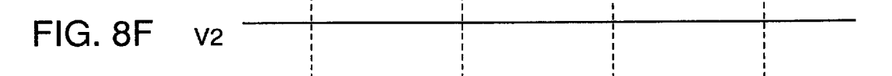
Figure 8G:
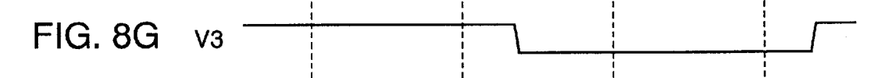
Figure 8H:
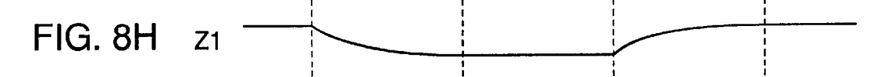
Figures 8I, 8J, 8K:
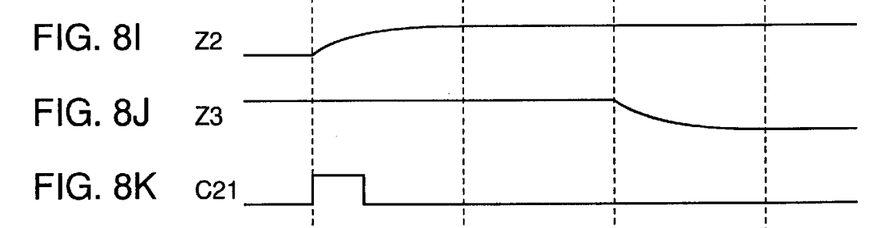
Figure 8L:
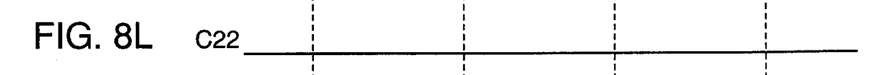
Figure 8M:
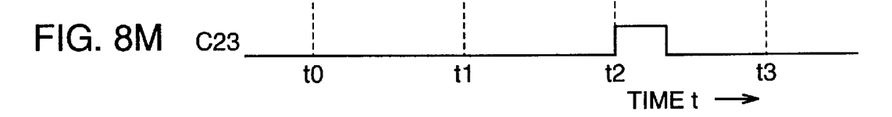

As represented in FIG. 8B, drive signal DR is a clock signal having a predetermined period and a duty ratio of ½. When signal DR rises from low to high, one input node of NAND gate 61 immediately goes high whereas the other input node of NAND gate 62 falls from high to low when a delay time of delay circuit 62 has elapsed. Thus, signal SH rises in response to a low to high transition of drive signal DR and signal SH goes low when the delay time of delay circuit 62 has elapsed, as represented in FIG. 8C. Signal /SH is an inverted version of signal SH, as represented in FIG. 8D.

It should be noted that clock signal CLK in FIGS. 2 and 3 goes and is held high for a predetermined period of time in response to a high to low transition of drive signal DR, as represented in FIG. 8A. Drive signal /DR in FIG. 5 is an inverted version of drive signal DR.

NOR gate 71 receives potentials V1 and Z2 of data transfer lines DL1 and DL12. NOR gate 72 receives potentials V2 and Z1 of data transfer lines DL2 and DL11. NOR gate 75 receives potentials V2 and Z3 of data transfer lines DL2 and DL13. NOR gate 76 receives potentials V3 and Z2 of data transfer lines DL3 and DL12. NOR gate 79 receives potentials V1 and Z3 of data transfer lines DL1 and DL13. NOR gate 80 receives potentials V3 and Z1 of data transfer lines DL3 and DL11. NOR gate 73 receives outputs from NOR gates 71 and 72. NOR gate 77 receives outputs from NOR gates 75 and 76. NOR gate 81 receives outputs from NOR gates 79 and 80.

Transfer gate 83 is connected between an output node of NOR gate 73 and one input node of NOR gate 74. Transfer gate 84 is connected between an output node of NOR gate 77 and one input node of NOR gate 78. Transfer gate 85 is connected between an output node of NOR gate 81 and one input node of NOR gate 82. Latch circuits 86–88 are respectively connected to NOR gates 74, 78, 82 at their respective one input nodes. latch circuits 86–88 each include two inverters connected in antiparallel.

Signal SH is input to transfer gates 83–85 at their respective p channel MOS transistors gates. Signal /SH is input to transfer gates 83–85 at their respective n channel MOS transistors gates and also to NOR gates 74, 78, 82 at their respective other input nodes. NOR gates 74, 78, 82 output signals which serve as control signals C21, C22, C23, respectively.

When signal SH is held low and signal /SH is held high, transfer gates 83–85 turn on and NOR gates 73, 77, 81 have their output levels passed to latch circuits 86–88, while control signals C21–C23 are fixed low.

When signal SH rises from low to high and signal /SH falls from high to low, transfer gates 83–85 turn off and NOR gates 73, 77, 81 have their respective output levels latched by latch circuits 86–88 and the signals output from latch circuits 86–88 are inverted by NOR gates 74, 78, 82 and thus provided as control signals C21–C23.

Reference will now be made to FIGS. 8A–8M to describe transfer circuit 5 operation. It is assumed here that select circuit 9 selects and connects data transfer lines DL1 and DL3 to data input/output lines IO1 and/IO1 and that data transfer lines DL1 and DL3 respectively go low and high while data transfer line DL2 is precharged high. It is also assumed here that data transfer lines DL11 and DL13 go high and data transfer line DL12 is held low.

When signal DR rises from low to high at time to, in the FIG. 7 circuit signal SH and/SH go and are held high and low, respectively, for a predetermined period of time and signal C21 goes and is held high for a predetermined period of time. Furthermore, in the FIG. 5 circuit, signals C11 and C14 go high and data transfer lines DL11, DL13 are connected to data input/output lines IO2, /IO2, while data transfer line DL12 is precharged. Furthermore, in the FIG. 6 circuit, clocked inverters 54–56 are activated to transmit data transfer lines DL1–DL3 potentials V1–V3 to data transfer lines DL11–DL13, while in response to signal C21, n channel MOS transistor 57 turns on for a predetermined period of time. Thus, a positive charge flows from data transfer line DL11 to be discharged low to data transfer line DL12 to be precharged high. Thus the positive charge of data transfer line DL11 can be effectively used to reduce current consumption.

Then, when signal DR falls from high to low at time t1, clocked inverters 54–56 are inactivated and clock signal CLK also goes high and data transfer lines DL1–DL3 potentials V1–V3 are taken into select circuit 9 control circuit 16. Thereafter, when a predetermined period of time has elapsed and clock signal CLK goes low, in the FIG. 3 circuit signals C2 and C4 go high to connect data transfer lines DL2, DL3 to data input/output lines IO1, /IO1, while data transfer line DL1 is precharged high. Simultaneously, new data are read on data input/output lines IO1, /IO1 and data transfer lines DL2 and DL3 go high and low, respectively. Since data transfer line DL1 is relatively short in length, less current is consumed for precharging the line.

Then, when signal DR rises from low to high at time t2, in FIGS. 7A and 7B signals SH and/SH go and are held high and low, respectively, and signal C23 is held high for a predetermined period of time. Furthermore, in the FIG. 5 circuit, signals C12 and C14 go high and data transfer lines DL12, DL13 are connected to data input/output lines IO2, /IO2, while data transfer line DL11 is precharged. Furthermore, in the FIG. 6 circuit, clocked inverters 54–56 are activated to transmit potentials V1–V3 from data transfer lines DL1–DL3 to data transfer lines DL11–DL13, while in response to signal C23, n channel MOS transistor 59 also turns on for a predetermined period of time. Thus, a positive charge flows from data transfer line DL13 to be discharged low to data transfer line DL11 to be precharged high. Thus the positive charge of data transfer line DL13 can be effectively used to reduce current consumption.

Thereafter, in a similar manner, rapid data transfer can be achieved with reduced current consumption.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data transfer circuit synchronized with a clock signal to transfer data from a transmitting circuit to a receiving circuit, comprising:

three sets of an upstream signal line and a downstream signal line arranged between said transmitting circuit and said receiving circuit;

a signal transmission circuit provided between each upstream signal line and each downstream signal line, synchronized with said clock signal to transmit a potential of said upstream signal line to said downstream signal line;

a first select circuit selecting two upstream signal lines of a first potential from three said upstream signal lines and using said data to set either one of the selected two upstream signal lines to a second potential and precharge a remaining one upstream signal line to said first potential;

a second select circuit selecting two downstream signal lines of said first potential from three said downstream signal lines and connecting the selected two downstream signal lines to said receiving circuit while precharging a remaining one downstream signal line to said first potential;

a third select circuit using each potential of said three sets of upstream and downstream signal lines to select a downstream signal line to be set to said second potential and a downstream signal line to be precharged to said first potential for a subsequent data transfer period; and a connection circuit synchronized with said clock signal to connect the two downstream signal lines selected by said third select circuit together for a predetermined period of time.

2. The data transfer circuit according to claim 1, said third select circuit includes:

a logic circuit associated with respective two of said three sets of upstream and downstream signal lines, outputting a control signal in response to a fact that said second potential has been attained by both an upstream signal line of one of said respective two sets of upstream and downstream signal lines and a downstream signal line of the other of said respective two sets of upstream and downstream signal lines; and a hold circuit holding a signal output from said logic circuit, and outputting said signal output from said logic circuit for said predetermined period of time in synchronization with said clock signal; wherein said connection circuit includes a switching element associated with said logic circuit, connected between two respective downstream signal lines and turning on in response to a fact that a respective hold circuit has output a control signal.

3. The data transfer circuit according to claim 1, wherein said downstream signal line is larger in capacitance than said upstream signal line.

* * * * *